(12) United States Patent
Ho et al.

(10) Patent No.: US 8,854,281 B2
(45) Date of Patent: Oct. 7, 2014

(54) HEAD UP DISPLAY (HUD)

(75) Inventors: Kevin Ho, Changhua County (TW);
Jih-Tao Hsu, Changhua County (TW);
Chih-Bin Chiang, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 112 days.

(21) Appl. No.: 13/309,747

(22) Filed: Dec. 2, 2011

(65) Prior Publication Data
US 2013/0141311 A1 Jun. 6, 2013

(51) Int. Cl.
*G09G 5/00* (2006.01)
*G02B 26/00* (2006.01)
*G02B 27/01* (2006.01)

(52) U.S. Cl.
USPC ............................. 345/7; 359/633; 359/292

(58) Field of Classification Search
CPC ........... G09G 5/00; G02B 25/00; G02B 27/01
USPC ................. 345/7; 340/425, 438, 461; 348/51; 359/295, 630, 632
See application file for complete search history.

(56) References Cited

U.S. PATENT DOCUMENTS

| | | | |
|---|---|---|---|
| 5,061,049 A * | 10/1991 | Hornbeck | 359/224.1 |
| 5,237,455 A * | 8/1993 | Bordo et al. | 359/632 |
| 5,535,047 A * | 7/1996 | Hornbeck | 359/295 |
| 6,580,562 B2 * | 6/2003 | Aoki et al. | 359/630 |
| 7,095,562 B1 * | 8/2006 | Peng et al. | 359/630 |
| 7,561,966 B2 | 7/2009 | Nakamura et al. | |
| 2006/0023065 A1 * | 2/2006 | Alden | 348/51 |
| 2008/0049149 A1 * | 2/2008 | Watanabe et al. | 348/739 |
| 2009/0140845 A1 * | 6/2009 | Hioki | 340/425.5 |
| 2010/0157430 A1 * | 6/2010 | Hotta et al. | 359/630 |
| 2011/0128602 A1 * | 6/2011 | Hamano et al. | 359/205.1 |

FOREIGN PATENT DOCUMENTS

| | | |
|---|---|---|
| CN | 1089039 A | 7/1994 |
| CN | 1629930 A | 6/2005 |
| EP | 0547493 A1 | 6/1993 |
| KR | 10-2009-0075997 A | 7/2009 |

* cited by examiner

*Primary Examiner* — Sumati Lefkowitz
*Assistant Examiner* — Peijie Shen
(74) *Attorney, Agent, or Firm* — Rosenberg, Klein & Lee

(57) ABSTRACT

A Head Up Display (HUD), comprising: an image display unit, to generate input images; a virtual image generation unit, to receive said input images and generate at least a virtual image; a rotation mechanism, used to make said virtual image generation unit to change its projection angle, to project virtual images to a plurality of transmission mirrors; and a plurality of transmission mirrors, used to receive said virtual images and reflect them into a large area virtual image. Advantage of said HUD is that, size of lens and mirrors is reduced, so said HUD is miniaturized, while realizing large area image display, such that information frame of vehicle match that of outside view, hereby solving problems of single optical route display device of the prior art, that is only capable of displaying a small area image rather than a large area image.

9 Claims, 12 Drawing Sheets

HEAD UP DISPLAY (HUD)

BACKGROUND OF THE INVENTION

1. Field of the Invention

The present invention relates to an optical system, and in particular to a Head Up Display (HUD) suitable for use in a moving vehicle.

2. The Prior Arts

It is well known that the Head Up Display (HUD) is an auxiliary aviation instrument that is first utilized in an aircraft, so that a pilot is able to look at the information on the panel without lowering his head, to avoid interruption of attention and lose Situation Awareness. The Head Up Display (HUD) can not only provide convenience in usage, but it can also raise the aviation safety. Therefore, it can be used in any types of the moving vehicles, such as aircrafts, or even automobiles and ships.

In the past, the Head Up Display of the prior art could provide only a small display area of simple instrument information within the eyesight of the driver, to indicate the critical information related to the moving vehicle. For the Head Up Displays (HUD) of the prior art, most of them belong to a single optical-route display device having only a small display area, and that is realized through the following ways. Firstly, the critical information is projected onto an optical device, and the display screen is placed inside the wind shield and facing the wind shield, so that the critical information is transmitted to the display screen through the optical device. Then, the critical information displayed on the display screen is reflected by the wind shield and displayed on the wind shield. Also, the position of display is in the eyesight directly in front of the driver, so that in driving a vehicle, the driver is able to view directly the vehicle driving speed or other data he desires to know, without the need to raise or lower his head to change his eyesight. However, according to the optical imaging principle of such a single optical-route display device, for any lens or mirrors utilized, the imaging area of the input image is positively proportional to the size of lenses and mirrors. As such, a Head Up Display requires an enormously large lens or mirror to project out virtual images, thus it is not easy to integrate such a single optical-route display device with an instrument panel into an integral unit, since the volume required by such a Head Up Display would be too large for the panel full of wires and connections. In addition, in order to keep the quality of imaging, the size of optical elements used for a Head Up Display can not be reduced further, therefore, it is rather difficult to achieve large display area in a very limited space of the driver cabin. Also, for the information displayed in an overly small display area, the driver is not able to obtain critical information right away by just glancing briefly over instrument control panel. Or, in case that the driver does raise his head to look at and get the critical information on the display panel in detail, that could disrupt his attention and put him in an immediate danger.

Therefore, presently, the design and performance of the Head Up Display (HUD) is not quite satisfactory, and it has much room for improvements.

SUMMARY OF THE INVENTION

In view of the problems and shortcomings of the prior art, the present invention provides a Head Up Display (HUD), for which size of optical elements such as lens or mirrors can be reduced drastically to have a larger display area, hereby realizing a high caliber Head Up Display (HUD), while achieving safety and efficiency.

A major objective of the present invention is to provide a Head Up Display (HUD). Wherein, a rotation mechanism partitions the image signals into individual images, and that is coupled with a technical means of re-converging images to realize imaging. In the present invention, lens or mirror of ordinary size is used to produce even larger display area, or the size of lens or mirror can be reduced, to reduce the volume of the head up display (HUD), so as to achieve large area image display effect in a limited space of a vehicle. The information frame provided by the Head Up Display can overlap entirely the images of an outside view, or the information frame can be matched with images of outside view to make a display as required, to help the driver to pay attention to the critical information of the moving vehicle, in solving shortcomings of the prior art that the single optical-route display device can only achieve small area display.

Another objective of the present invention is to provide a Head Up Display (HUD), that utilizes a rotation mechanism to project and converge individual images, and to adjust its image display angle based on the height and seating gesture of the driver by means of the adjustability of a transmission mirror. Compared with the single optical-route display device of the prior art, the present invention enables the driver to have full attention driving and comfort in driving.

In order to achieve the above-mentioned objective, the present invention provides a Head Up Display (HUD), at least comprising: an image unit, used to produce one or more input images; a least a virtual image generation unit, to receive input image and produce at least a virtual image; a rotation mechanism, capable of controlling rotation angles of the virtual image generation unit, to change the virtual image projection angle of the virtual image generation unit; and a plurality of transmission mirrors, used to receive virtual images and reflect them into a large area virtual image.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a Head Up Display (HUD), that utilizes a rotation mechanism and a virtual image generation unit to partition images, or a plurality of image display units are used to present the individual image, and that is supplemented with an image re-converging means, to display large area image, while reducing sizes of lens or mirror. In the present invention, optimal image display angle can be obtained based on height and seating gesture of the driver through using the adjustability of the transmission mirrors.

Figure 1:
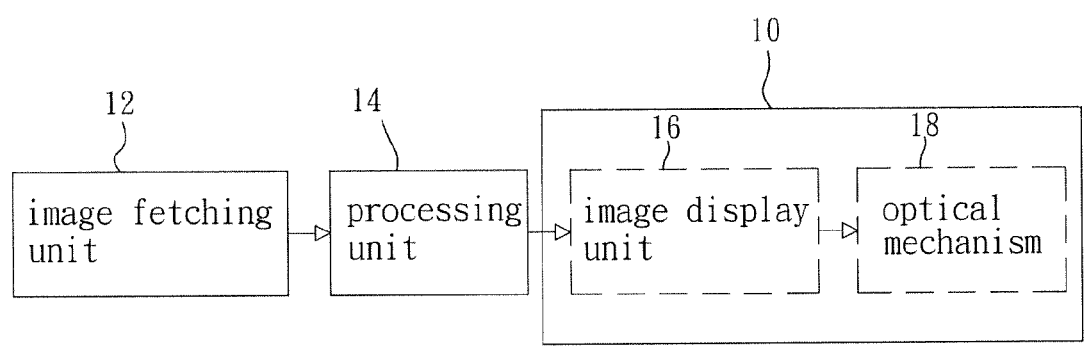
FIG. 1 is a system block diagram of a Head Up Display (HUD) according to the present invention.

Refer to FIG. 1 for a system block diagram of a Head Up Display (HUD) according to the present invention. As shown in FIG. 1, the Head Up Display (HUD) 10 of the present invention includes: an image display unit 16, and an optical mechanism 18, such that the HUD 10 operates in cooperation with an image fetching unit 12 made of charge-coupled device (CCD) elements or CMOS elements; and also in cooperation with a processing unit 14, that can be a central processor unit (CPU), a microprocessor, or a single chip microcomputer. Wherein, the image display unit 16 is made of a liquid crystal display (LCD) or a digital optical projector. When the processing unit 14 is connected electrically to the image fetching unit 12 and the image display unit 16, one or more image fetching units 12 can be used to fetch images of views in front of the moving vehicle, such as lane markings, horizontal line, or obstacle contours; or, additionally, one or more image fetching units 12 installed around the perimeter of the moving vehicle can be used to fetch images of blind angle as external signals. The processing unit 14 integrates the critical information required by the moving vehicle, such as the external signals received by the image fetching unit 12, and at the same time proceeds with receiving and processing the signals of moving vehicle relating to vehicle operation temperature, engine rotation speed, vehicle driving speed, guidance information, tire pressure, gear shift reminder, turning-around and back-up reminder, obstacle warning, flying attitude, flying speed, flying direction, vertical speed variations, vehicle inclination angle, wind direction, vehicle moving-forward or slow-down, or obstacle warning obtained through detecting obstacle contour. As such, the processing unit 14 combines the critical information required by the moving vehicle, and processes them into an image signal. Finally, the processor unit 14 transmits the image signals to the image display unit 16, for it to generate at least an input image and transmit it to the optical mechanism 18.

Figure 2:
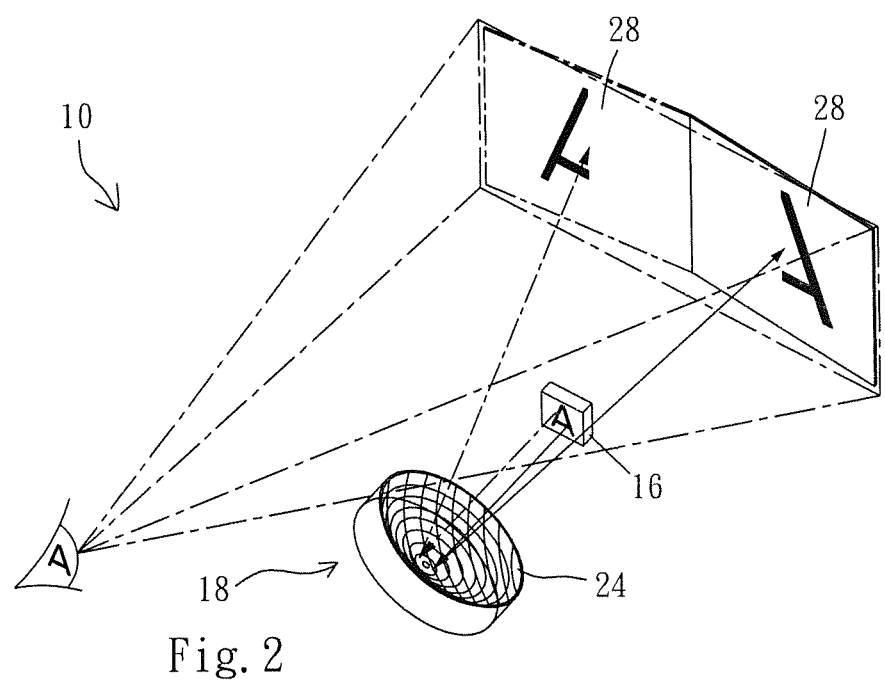
FIG. 2 is a schematic diagram of an optical mechanism of the head up display according to the first embodiment of the present invention.
Figure 3A:
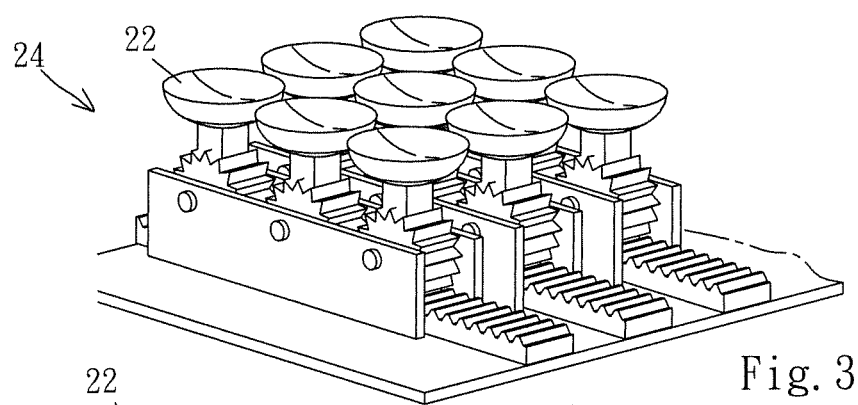
FIG. 3A is a schematic diagram of a virtual image generation unit of the head up display according to the first embodiment of the present invention.
Figure 3B:
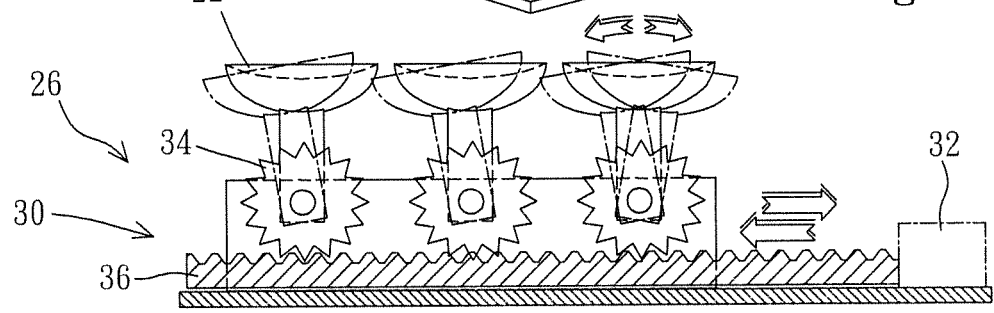
FIG. 3B is a schematic diagram of a virtual image generation unit and rotation mechanism of the head up display according to the first embodiment of the present invention.

Then, refer to FIGS. 2, 3A, and 3B respectively for a schematic diagram of an optical mechanism of the head up display according to the first embodiment of the present invention; a schematic diagram of a virtual image generation unit of the head up display according to the first embodiment of the present invention; and a schematic diagram of a virtual image generation unit and rotation mechanism of the head up display according to the first embodiment of the present invention; meanwhile refer to FIG. 1. In this embodiment, a plurality of micro-mirrors on a digital micro-mirror device (DMD) is used as a virtual image generation unit. As shown in the drawings, the Head Up Display (HUD) 10 at least includes: an image display unit 16, to generate one or more input images; and an optical mechanism 18, to receive input image and generate virtual images. As shown in FIGS. 2, 3A, 3B, the optical mechanism 18 at least includes: an image display unit 16, a digital micro-mirror device 24, and a plurality of transmission mirrors 28. Wherein, the virtual image generation unit 22 in the digital micro-mirror device 24 receives the input image generated by the image display unit 16, and it generates at least a virtual image; and the plurality of transmission mirrors 28 receive the corresponding virtual images and reflect them into a large area virtual image. The detailed structure of the virtual image generation unit 22 is as shown in FIG. 3A, wherein, a plurality of virtual image generation units 22 (also referred to as magnifying optical elements) are arranged into a matrix array, to form a digital micro-mirror device 24. The virtual image generation unit 22 operates in cooperation with the rotation mechanism 26, so that its rotation angle is controlled, to change the virtual image projection angle. Since each of the input image is composed of a plurality of pixels, and each virtual image generation unit 22 corresponds to at least a pixel, such that the technical means of the present invention is that, the number of transmission mirrors 28 is equal to the number of sway states of the rotation mechanism 26. Namely, in FIG. 2, the rotation mechanism 26 having left and right two sections of sway states is taken as an example for explanation, therefore, two transmission mirrors 28 are used for implementation. In case that the rotation mechanism 26 is designed to have left, middle, and right three sections of sway states, then three transmission mirrors 28 are required for implementation. Similarly, in case that the rotation mechanism 26 is designed to have a plurality of sway states, then equal number of transmission mirrors 28 are provided, and its operation principle is similar, thus it will not be repeated here for brevity.

FIG. 3B shows the detailed structure of the rotation mechanism 26, wherein, the rotation mechanism 26 includes an actuation unit 30, and a power unit 32. The actuation unit 30 is composed of a gear wheel 34 and a rack 36, and the power unit 32 may utilizes a micro motor, such that the power unit 32 can provide power required to bring the actuation unit 30 into action, so that the actuation unit 30 may control the virtual image generation unit 22. Meanwhile, the rotation mechanism 26 sways the virtual image generation unit 22 rapidly in a period of 1/60 second. Namely, the virtual image generation unit 22 is swayed 60 times or more per second to project the virtual image to the transmission mirrors 28 in front. Due to the persistence of human eye vision, the transmission mirrors 28 present a virtual image display screen.

Figure 4:
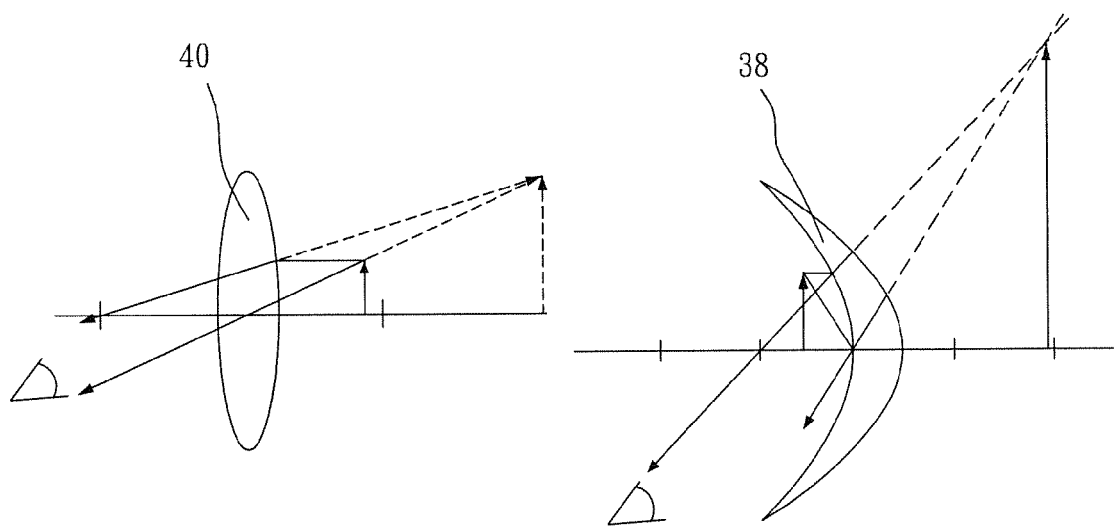
FIG. 4 is a schematic diagram of image formation of virtual image generation unit according to the first embodiment of the present invention.
Figure 5:
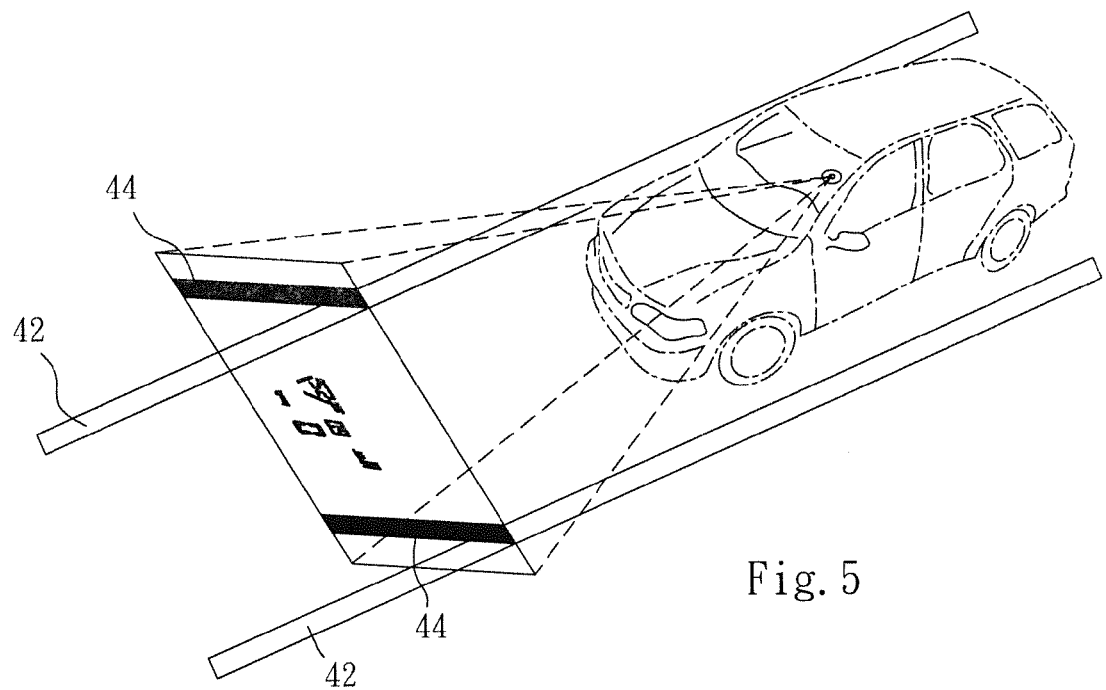
FIG. 5 is a schematic diagram of large area image formation according to the first embodiment of the present invention.

Subsequently, refer to FIGS. 4, 5, 6, and 7 respectively for a schematic diagram of image formation of virtual image generation unit, large area image formation, optical characteristics of a concave lens, and a curved mirror image formation according to the first embodiment of the present invention. As shown in FIGS. 4 and 5, the virtual image generation unit 22 can be an optical element, such as a concave lens 38 or a convex lens 40, either of them utilizes optical principle of upright magnified virtual image to generate virtual images, thus image is formed outside the window in a large area manner, such that the virtual image generated can at least match the actual lane marking 42, and corresponds to the virtual image lane marking 44.

Figure 6:
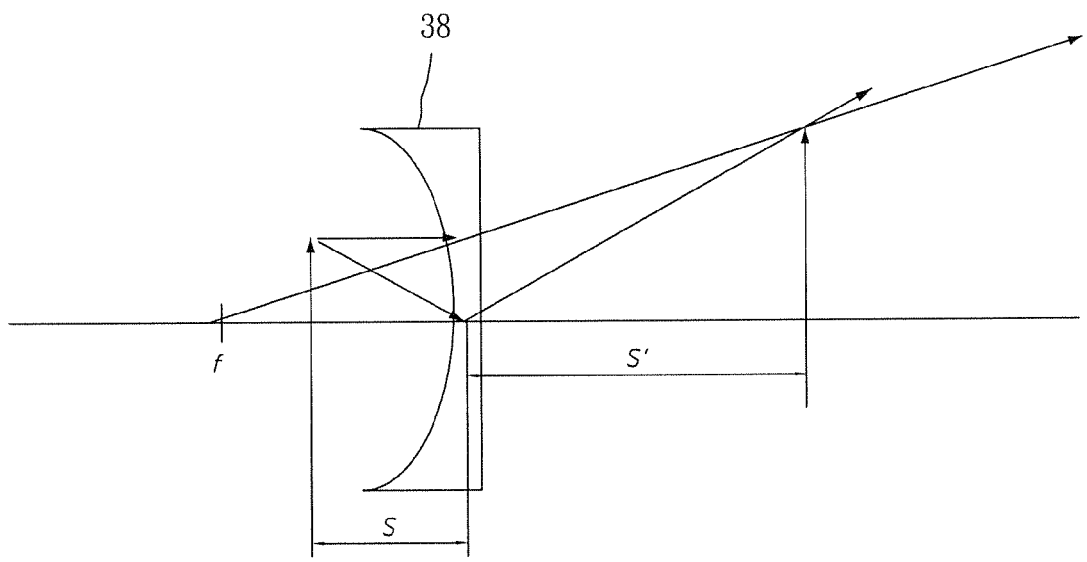
FIG. 6 is a schematic diagram of optical characteristics of a concave lens according to the first embodiment of the present invention.

As shown in FIG. 6, the optical characteristics of the concave lens 38 of the present invention are that, when its radius of curvature R is ∞, then it is a concave lens 38, with its focal length ∞; and when its radius of curvature R is 100, then it is an arc concave lens 38, with its focal length 50. The concave lens 38 may produce virtual image, and its focal length is as shown in equation (1):

$$f = R/2 \quad (1)$$

the curved surface of the concave lens 38 can be designed to be an aspheric surface, to avoid generating optical aberrations. When the input image is placed within the focal length, the concave lens 38 will present a magnified virtual image, with its magnification ratio as shown in equations (2) and (3):

$$1/S + 1/S' = 1/f \quad (2)$$

$$m = S'/S \quad (3)$$

In equations (1) to (3), R is a radius of curvature, S is an object distance, S' is an image distance, f is a focal length, and m is a magnification ratio.

Figure 7:
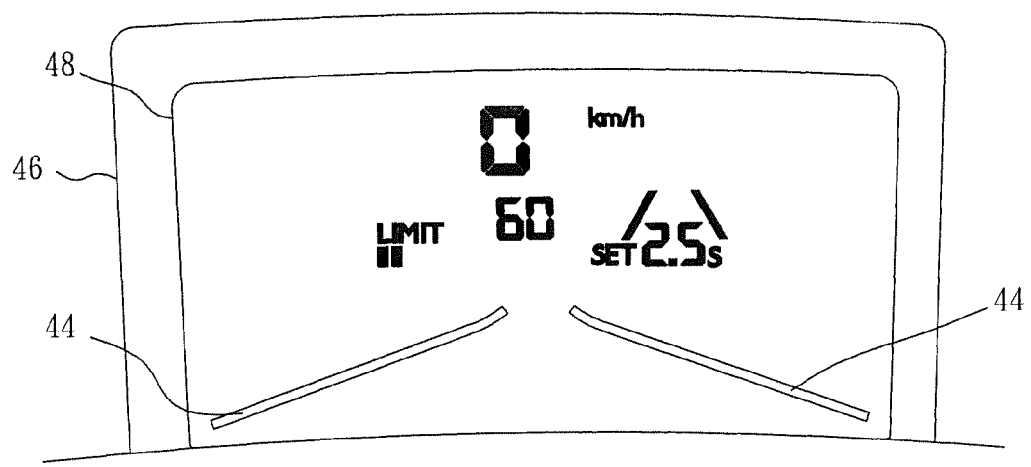
FIG. 7 is a schematic diagram of a curved mirror image formation according to the first embodiment of the present invention.

Then, as shown in FIG. 7, in case that the HUD 10 is used in an automobile, the image display area may correspond to the virtual image lane marking 44, with the image covering an area of 4 meter wide by 1 meter high. Wherein, the transmission mirror 28 is a planar plate having high reflectivity optical thin film, with its transmission rate between 70% and 75%, and its reflection rate between 25% and 30%, and it is put inside the wind shield 46. As such, the driver may gaze the virtual image in front through the transmission mirror 28 and the wind shield 46 in sequence, such that the virtual image overlaps the views in front, or it displays the virtual image corresponding to the views in front, and when the number is large for the transmission mirrors 28 and the corresponding optical routes, the transmission mirrors 28 appear as a curved mirror 48, so as to display a large image. In addition, through the adjustability of the transmission mirror 28, a driver may adjust the display angle of the transmission mirror 28 based on his height and seating gesture. In FIGS. 5 and 7, an automobile is used as moving vehicle for explanation, so the virtual image lane marking 44 is used as a reference for explanation. Of course, for other moving vehicles such as aircrafts or ships, horizontal lines can be used as a reference, and its principle of operation is the same as mentioned above, and it will not be repeated here for brevity.

Figure 8A:
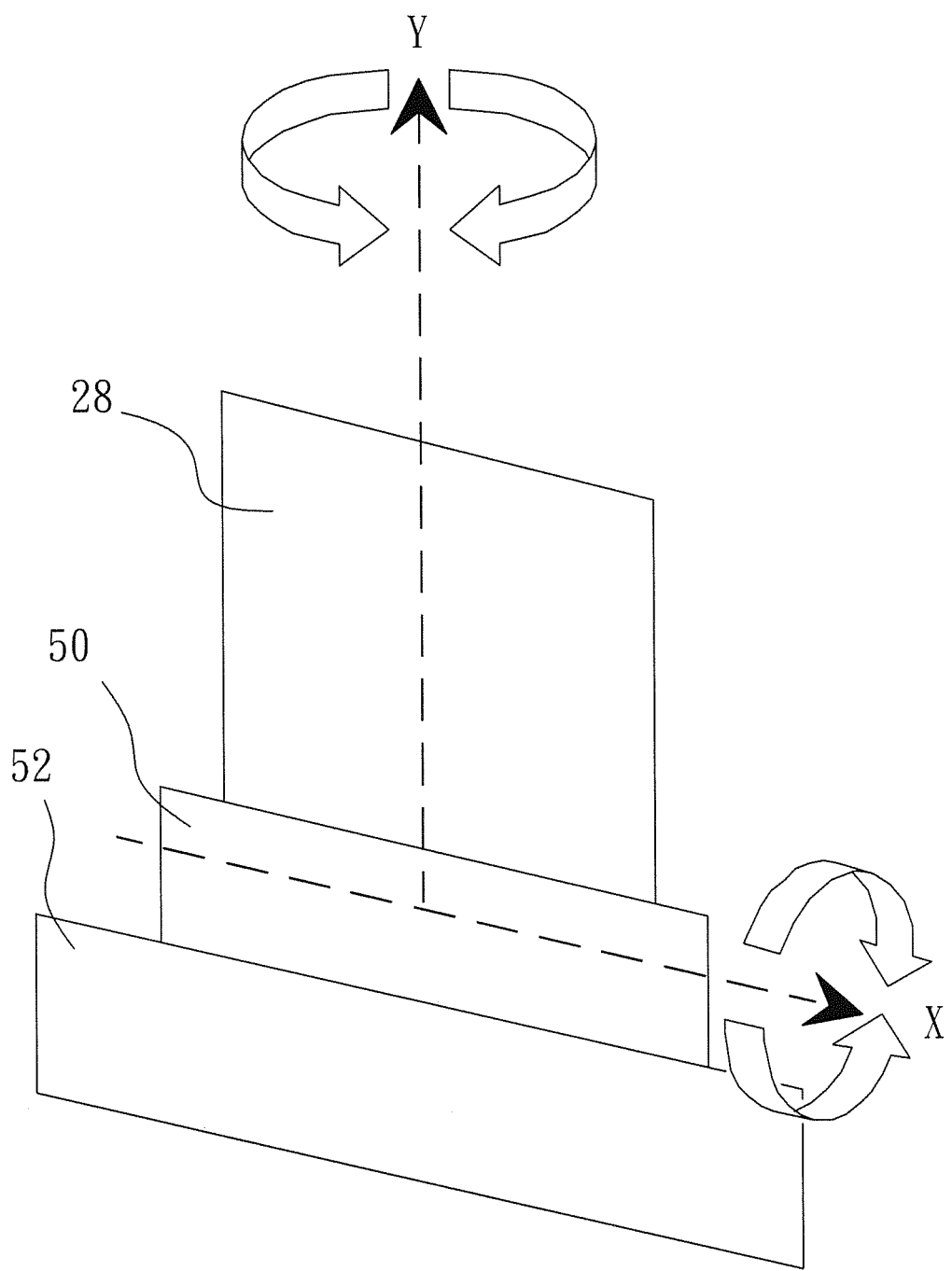
FIG. 8A is a schematic diagram of an adjustable transmission mirror according to the first embodiment of the present invention.
Figure 8B:
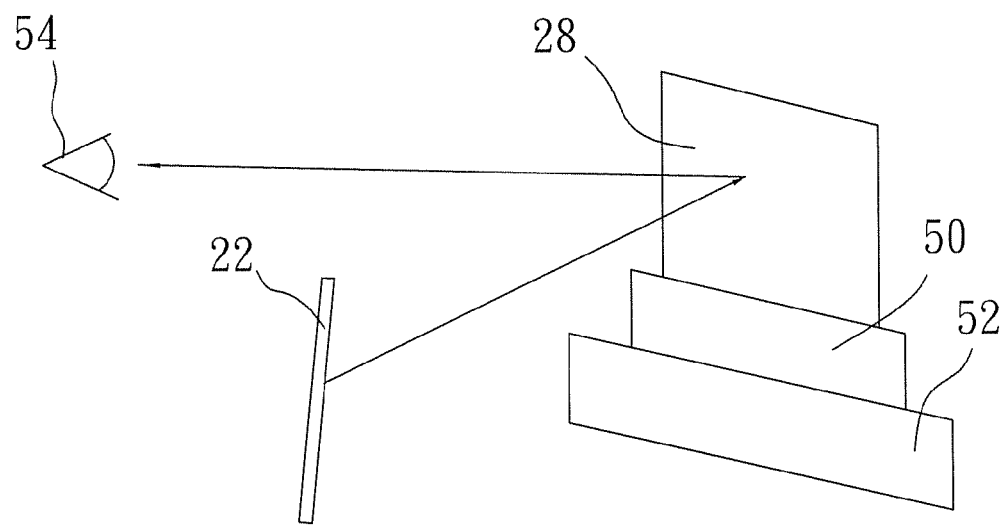
FIG. 8B is a front view of an adjustable transmission mirror according to the first embodiment of the present invention.
Figure 8C:
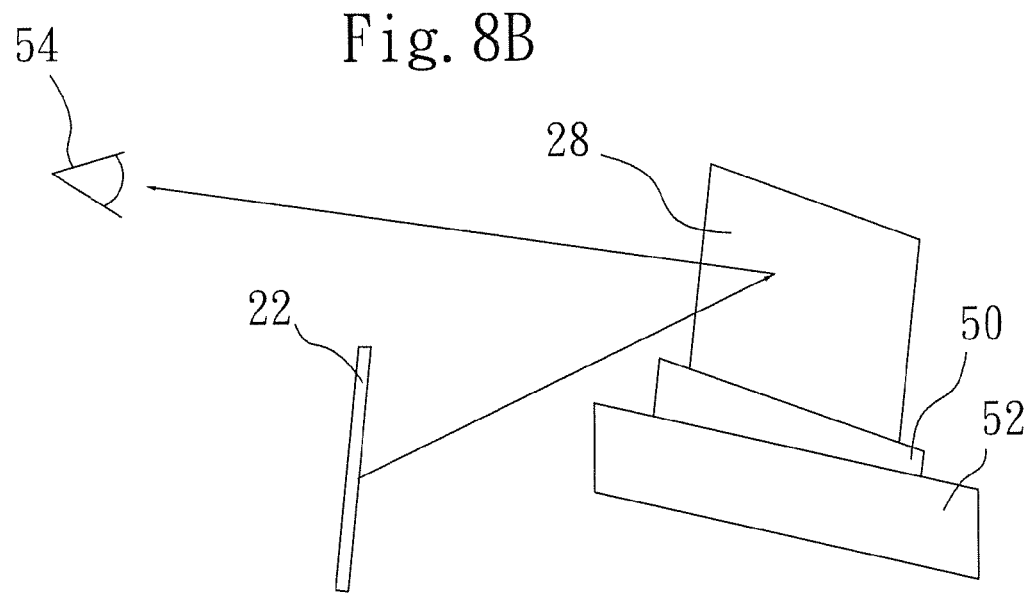
FIG. 8C is a top view of the adjustable transmission mirror according to the first embodiment of the present invention.

Refer to FIGS. 8A, 8B, and 8C respectively for a schematic diagram, a front view, and a top view of an adjustable transmission mirror according to the first embodiment of the present invention. As shown in FIGS. 8A, 8B, and 8C, the transmission mirror 28 of the present invention is adjustable, so that a driver may adjust it to a proper display angle based on his height and seating gesture. As shown in FIG. 8A, the transmission mirror 28 is fixed on a rotation mechanism 50, and that is in turn disposed on a rotation actuation mechanism 52, so that the rotation mechanism 50 can be rotated around the horizontal axis X in a clockwise or a counterclockwise direction, and the rotation actuation mechanism 52 can be rotated around vertical axis Y in a clockwise or a counterclockwise direction, such that the transmission mirror 28 is adjustable, and it can be adjusted to a proper display angle based on the height and seating gesture of the driver. As shown in FIGS. 8B and 8C, the rotation mechanism 50 and the rotation actuation mechanism 52 can be rotated based on the position of human eyes 54, to adjust the transmission mirror 28 to an optimal display angle.

Figure 9A:
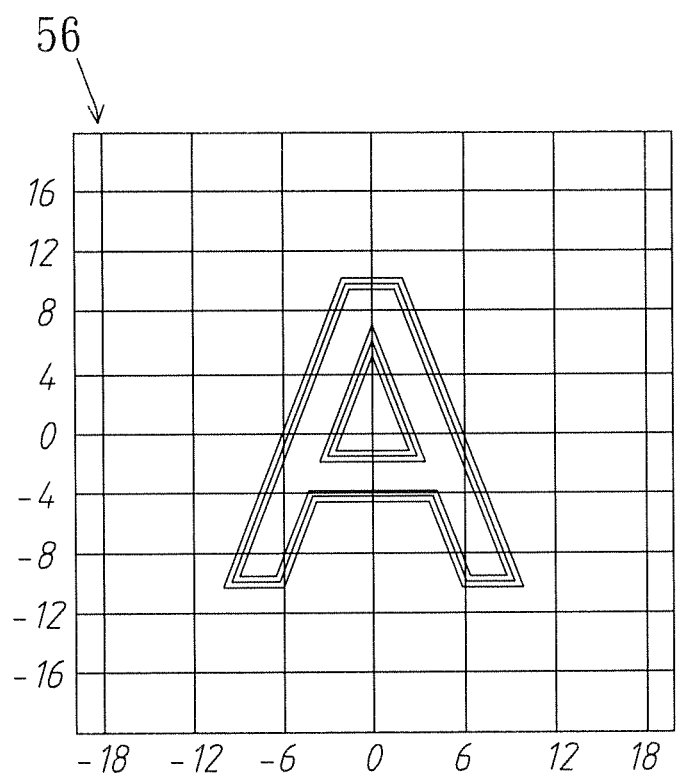
FIG. 9A is a schematic diagram of vision converged range according to the first embodiment of the present invention.
Figure 9B:
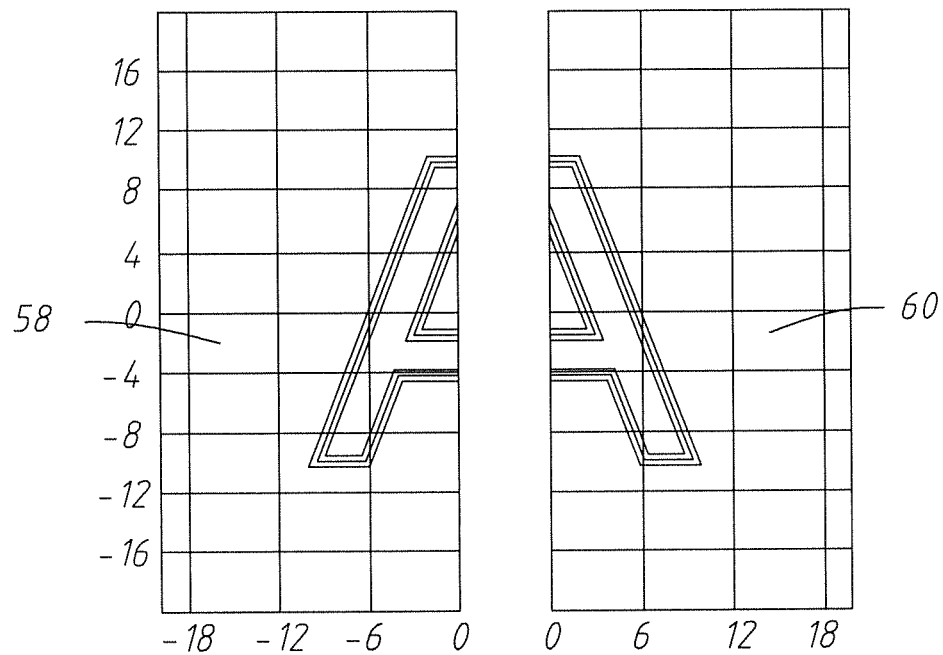
FIG. 9B is a schematic diagram of left half portion and right half portion of vision converged image according to the first embodiment of the present invention.
Figure 9C:
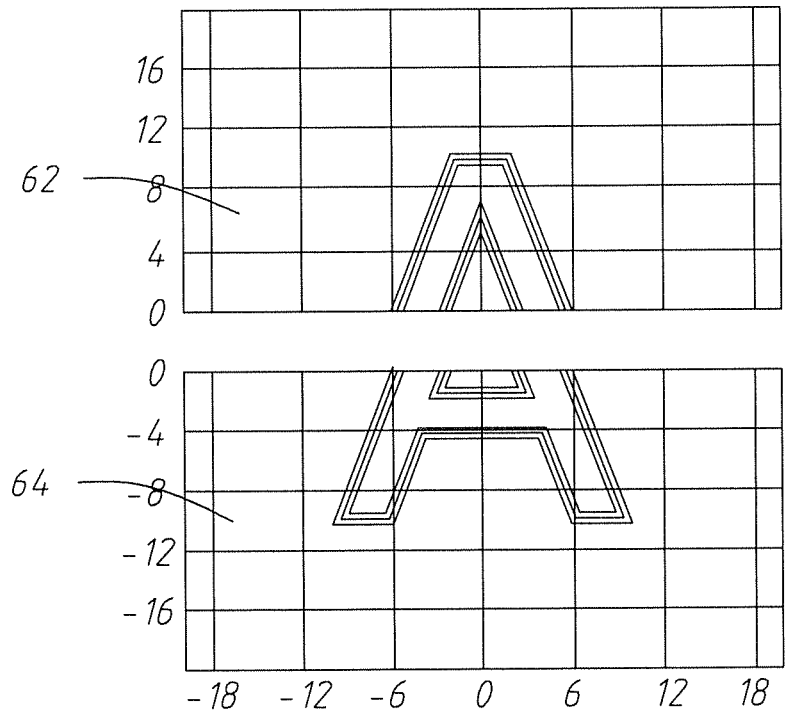
FIG. 9C is a schematic diagram of upper half portion and lower half portion of vision converged image according to the first embodiment of the present invention.

Refer to FIGS. 9A, 9B, and 9C for a schematic diagram of vision converged range, left half portion and right half portion of vision converged image, upper half portion and lower half portion of vision converged image according to the first embodiment of the present invention. As shown in FIGS. 9A, 9B, and 9C, in the Head Up Display (HUD) 10 of the present invention, a vision converged range 56 is provided, so that the transmission mirror 28 is able to reflect the virtual image into the vision converged range 56 to present a large area virtual image. Since in the first embodiment of the present invention, at least two input images are taken as example for explanation, so two optical routes are used to present the left half portion 58, the right half portion 60, or the upper half portion 62, the lower half portion 64 of the virtual image, and reflects them into the vision converged range 56. When various parts of virtual images are combined together in vision converged range 56, a large area virtual image can be observed. Similarly, in case that three or more input images are taken as embodiment, then three or more portions of virtual images can be presented in the vision converged range 56. Its principle of implementation is the same as that mentioned above, thus it will not be repeated here for brevity.

Figure 10:
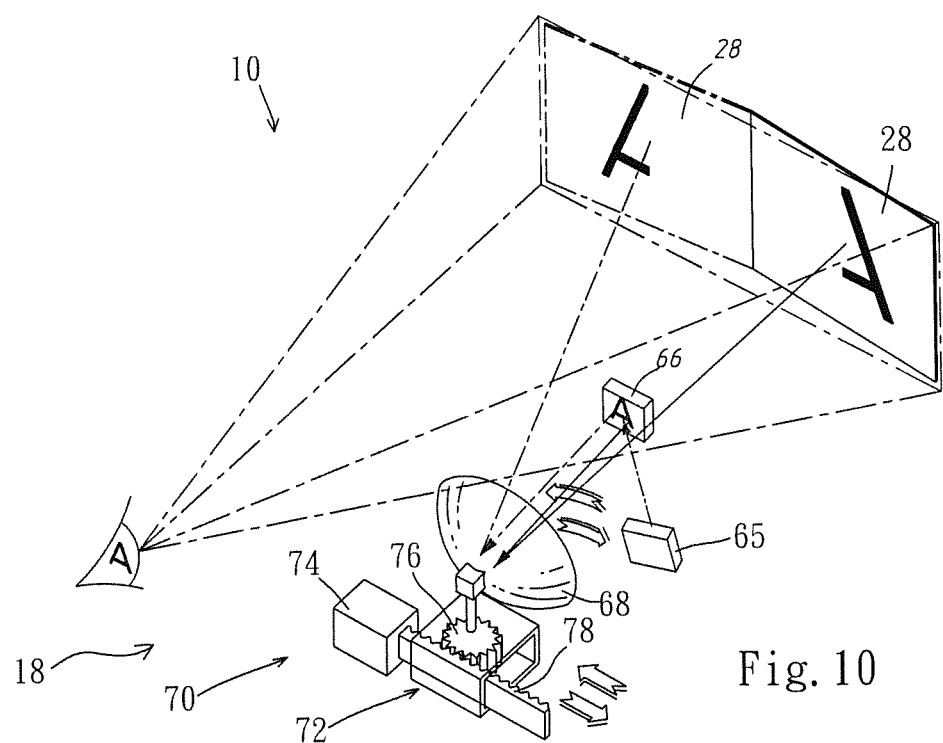
FIG. 10 is a system block diagram of a Head Up Display (HUD) according to the second embodiment of the present invention.

Finally, refer to FIG. 10 for a system block diagram of a Head Up Display (HUD) according to the second embodiment of the present invention, meanwhile refer to FIGS. 4, 9A, 9B, and 9C. As shown in FIG. 10, a head up display (HUD) 10 further includes a light source generation element 65, that can serve as a light source. In the optical mechanism 18, a digital micro-mirror device (DMD) is used to realize the image display unit 66. Since the image display unit 66 is composed of a plurality of micro-mirrors to form into a matrix array, and each input image contains a plurality of pixels, so each of micro-mirrors corresponds to each of the pixels, such that the number of micro-mirrors on the image display unit 66 is equal to the number of pixels. When the image display unit 66 receives lights coming from the light source generation element 65, it generates one or more input images. Since the image display unit 66 is able to control the on and off states of each pixel (similar to a digital switch 1-on or 0-off state), so it can determine which part of pixels is to be projected. When the micro-mirrors on the image display unit 66 project a portion of pixels onto the virtual image generation unit 68, that will in turn project the virtual image to the transmission mirror 28, to realize the same purpose and effect of combining various virtual images into a large area virtual image of the first embodiment, as shown in FIG. 4. In the present embodiment, the virtual image generation unit 68 may use a concave lens 38 or a convex lens 40, likewise, it utilizes optical principle of upright magnified virtual image to generate virtual images. Similarly, in the present embodiment, a rotation mechanism 70 controls the rotation angles of the virtual image generation unit 68, so the virtual image generation unit 68 is able to change the projection angle of the virtual image, to project each of the pixels to the transmission mirrors 28, and that receives the corresponding virtual images and reflects them into a large area virtual image. Moreover, the rotation mechanism 70 includes an actuation unit 72 and a power unit 74. The actuation unit 72 can be a gear wheel 76, a rack 78, or a combination of them; while the power unit 74 can be a step motor. Similarly, the rotation mechanism 70 sways the virtual image generation unit 68 rapidly in a period of 1/60 second, also the vision persistence of human eye works the same way as it does in the first embodiment, thus it will not be repeated here for brevity. In this second embodiment, at least two input images are taken as example for explanation, therefore, likewise, two optical routes are utilized to present and reflect the left half portion 58 and the right half portion 60, or the upper half portion 62 and the lower half portion 64 of virtual image into the vision converged range 56. Its principle of implementation is the same as the first embodiment, and it will not be repeated here for brevity.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A Head Up Display (HUD), comprising at least:
   an image display unit generating one or more input images;
   at least a virtual image generation unit including a plurality of magnifying optical elements arranged into a matrix array to form a digital micro-mirror device, said virtual image generation unit sequentially addressing each of a plurality of input image portions, each image portion including a plurality of pixels, said virtual image generation unit receiving said input image portions and producing a plurality of virtual images, each virtual image corresponding to a respective one of said input image portions;
   a rotation mechanism controlling rotation angles of said virtual image generation unit, said rotation mechanism changing rotation angles of said virtual image generation unit to change a projection angle between a portion of said virtual images for display of said plurality of virtual images in spaced relation one from another; and
   a plurality of transmission mirrors, each transmission mirror respectively receiving a portion of said plurality of virtual images at a different one of said projection angles and reflecting the plurality of virtual images to a viewer to thereby appear concurrently as a large area virtual image;
   wherein each magnifying optical element of said plurality thereof corresponds to at least one of said pixels and is swayed by said rotation mechanism in a predetermined fashion to project a respective one of said plurality of virtual images generated thereat onto a respective one of said plurality of transmission mirrors, wherein said rotation mechanism has a plurality of swaying states, and wherein a number of said transmission mirrors in said plurality thereof substantially equals to a number of said swaying states of said rotation mechanism.

2. The Head Up Display (HUD), as claimed in claim 1, further comprising:
   a light source generation unit, used to generate a light source, wherein said image display unit is a digital micro-mirror device and contains a plurality of micro-mirrors, said micro-mirrors being arranged a matrix array, such that said image display unit receives light from said light source to generate said input images, wherein, each said input image has a plurality of pixels, and each said micro-mirror corresponds respectively to each said pixel, so that number of said micro-mirrors substantially equals to that of said pixels.

3. The Head Up Display (HUD), as claimed in claim 1, wherein said rotation mechanism further includes an actuation unit and a power unit, wherein said power unit provides power to bring said actuation unit into action to control said virtual image generation unit, and wherein said power unit includes a step motor or a micro motor.

4. The Head Up Display (HUD), as claimed in claim 1, wherein said image display unit is a liquid crystal display or a digital optical projector.

5. The Head Up Display (HUD), as claimed in claim 1, wherein a vision converged range is provided, so that said each transmission mirror reflects to display said large area virtual image into said vision converged range.

6. The Head Up Display (HUD), as claimed in claim 1, further comprising:
   at least an image fetching unit and at least a processing unit connected to said image fetching unit and said image display unit, wherein said image fetching unit fetches an external signal, wherein said processing unit is used to receive said external signal from said image fetching unit, and process said external signal and a vehicle signal into an image signal, and wherein said processing unit transmits said image signal to said image display unit, so that said image display unit generates said input image.

7. The Head Up Display (HUD), as claimed in claim 6, wherein said external signal relates to a lane marking, a horizontal line, or an obstacle contour; and wherein said vehicle signal relates to vehicle operation temperature, engine rotation speed, vehicle driving speed, guidance information, tire pressure, gear shift reminder, turning-around and back-up reminder, obstacle warning, flying attitude, flying speed, flying direction, vertical speed variations, vehicle inclination angle, wind direction, and vehicle moving-forward or slow-down.

8. The Head Up Display (HUD), as claimed in claim 1, wherein said virtual image generation unit includes at least one concave lens, at least one convex lens, or a combination of both.

9. The Head Up Display (HUD), as claimed in claim 1, wherein said each transmission mirror includes a planar plate of a high reflectivity optical thin film, with its transmission rate between 70% and 75%, and its reflection rate between 25% and 30%, and wherein a display angle of said each transmission mirror is adjustable and is adjusted to a proper display angle.

* * * * *